US 7,885,851 B2

(12) United States Patent
Hurt et al.

(10) Patent No.: US 7,885,851 B2
(45) Date of Patent: Feb. 8, 2011

(54) RETAILER OPTIMIZATION USING MARKET SEGMENTATION TOP QUINTILE PROCESS

(75) Inventors: John Hurt, Ocean Springs, MS (US); Michael Dax Flinn, Suwanee, GA (US); Jim O'Brien, Burlington, MA (US)

(73) Assignee: Scientific Games International, Inc., Newark, DE (US)

( * ) Notice: Subject to any disclaimer, the term of this patent is extended or adjusted under 35 U.S.C. 154(b) by 1118 days.

(21) Appl. No.: 11/601,259

(22) Filed: Nov. 17, 2006

(65) Prior Publication Data

US 2007/0112619 A1    May 17, 2007

Related U.S. Application Data

(60) Provisional application No. 60/737,793, filed on Nov. 17, 2005.

(51) Int. Cl.
G06F 17/30 (2006.01)
(52) U.S. Cl. ........................................... 705/10
(58) Field of Classification Search .................... 705/10
See application file for complete search history.

(56) References Cited

U.S. PATENT DOCUMENTS

| | | |
|---|---|---|
| 3,982,102 A | 9/1976 | Cidade |
| 4,398,708 A | 8/1983 | Goldman et al. |
| 4,494,197 A | 1/1985 | Troy et al. |
| 4,665,502 A | 5/1987 | Kreisner |
| 4,689,742 A | 8/1987 | Troy et al. |
| 4,740,016 A | 4/1988 | Konecny et al. |
| 4,835,624 A | 5/1989 | Black et al. |
| 4,842,278 A | 6/1989 | Markowicz |
| 4,922,522 A | 5/1990 | Scanlon |
| 4,961,578 A | 10/1990 | Chateau |
| 5,046,737 A | 9/1991 | Fienberg |
| 5,092,598 A | 3/1992 | Kamille |
| 5,112,050 A | 5/1992 | Koza et al. |
| 5,116,049 A | 5/1992 | Sludikoff et al. |
| 5,119,295 A | 6/1992 | Kapur |

(Continued)

FOREIGN PATENT DOCUMENTS

GB    2075918    11/1987

(Continued)

OTHER PUBLICATIONS

Sleight (Optimising Retail Networks: A case study of locating Camelot's lottery terminals, Journal of Targeting, Measurement and Analysis for Marketing. London, Jun. 2002. vol. 10, Iss. 4; p. 353).*

(Continued)

*Primary Examiner*—Kambiz Abdi
*Assistant Examiner*—William Rankins
(74) *Attorney, Agent, or Firm*—Dority & Manning, P.A.

(57) ABSTRACT

A method for determining an optimal number of lottery retailers is disclosed. The optimal number of lottery retailers for a region can be determined based households of the same segmentations purchasing lottery products similarly, and there is a strong correlation between lottery agent density (population/retailers) and per capita lottery sales. The lottery agent density (LAD) necessary to produce high per capita sales can be identified and applied to all markets of that household segmentation.

9 Claims, 16 Drawing Sheets

| Key | Population | Retailer | Lottery sales | LAD | PC sales | Pop. Group A | Pop. Group B |
|---|---|---|---|---|---|---|---|
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |
| | | | | | | | |

U.S. PATENT DOCUMENTS

| | | | |
|---|---|---|---|
| 5,129,652 | A | 7/1992 | Wilkinson |
| 5,158,293 | A | 10/1992 | Mullins |
| 5,186,463 | A | 2/1993 | Marin et al. |
| 5,249,801 | A | 10/1993 | Jarvis |
| 5,282,620 | A | 2/1994 | Keesee |
| 5,380,007 | A | 1/1995 | Travis et al. |
| 5,472,196 | A | 12/1995 | Rusnak |
| 5,499,816 | A | 3/1996 | Levy |
| 5,518,239 | A | 5/1996 | Johnston |
| 5,613,679 | A | 3/1997 | Gasa et al. |
| 5,682,819 | A | 11/1997 | Beatty |
| 5,704,647 | A | 1/1998 | Desbiens |
| 5,772,510 | A | 6/1998 | Roberts |
| 5,772,511 | A | 6/1998 | Smeltzer |
| 5,791,990 | A | 8/1998 | Schroeder et al. |
| 5,887,906 | A | 3/1999 | Sultan |
| 5,915,588 | A | 6/1999 | Stoken et al. |
| 6,017,032 | A | 1/2000 | Grippo et al. |
| 6,024,641 | A | 2/2000 | Sarno |
| 6,080,062 | A | 6/2000 | Olson |
| 6,089,978 | A | 7/2000 | Adams |
| 6,146,272 | A | 11/2000 | Walker et al. |
| 6,155,491 | A | 12/2000 | Dueker et al. |
| 6,168,521 | B1 | 1/2001 | Luciano et al. |
| 6,220,961 | B1 | 4/2001 | Keane et al. |
| 6,224,055 | B1 | 5/2001 | Walker et al. |
| 6,241,246 | B1 | 6/2001 | Guttin et al. |
| 6,273,817 | B1 | 8/2001 | Sultan |
| 6,379,742 | B1 | 4/2002 | Behm et al. |
| 6,497,408 | B1 | 12/2002 | Walker et al. |
| 6,648,755 | B1 | 11/2003 | Luciano et al. |
| 6,676,126 | B1 | 1/2004 | Walker et al. |
| 6,685,562 | B1 | 2/2004 | Rantanen |
| 6,773,345 | B2 | 8/2004 | Walker et al. |
| 6,875,105 | B1 | 4/2005 | Behm et al. |
| 6,889,978 | B2 | 5/2005 | Schaefer et al. |
| 6,969,318 | B1 | 11/2005 | Packes, Jr. et al. |
| 2001/0044336 | A1 | 11/2001 | Reiss et al. |
| 2002/0003335 | A1 | 1/2002 | Schaefer et al. |
| 2002/0022511 | A1 | 2/2002 | Eklund et al. |
| 2002/0037766 | A1 | 3/2002 | Muniz |
| 2002/0119817 | A1 | 8/2002 | Behm et al. |
| 2003/0050109 | A1 | 3/2003 | Caro et al. |
| 2003/0114210 | A1 | 6/2003 | Meyer et al. |
| 2003/0224854 | A1 | 12/2003 | Joao |
| 2004/0029627 | A1 | 2/2004 | Hannan et al. |
| 2004/0056416 | A1 | 3/2004 | Bennett |
| 2004/0173965 | A1 | 9/2004 | Stanek |
| 2004/0204222 | A1 | 10/2004 | Roberts |
| 2004/0266514 | A1 | 12/2004 | Penrice |
| 2005/0003884 | A1 | 1/2005 | Meyer et al. |
| 2006/0252488 | A1 | 11/2006 | Lalonde et al. |

FOREIGN PATENT DOCUMENTS

| | | |
|---|---|---|
| WO | WO9926204 | 5/1999 |
| WO | WO0174460 | 10/2001 |

OTHER PUBLICATIONS

Optimising Retail Networks: A case study of locating Camelot's lottery terminals, Journal of Targeting, Measurement and Analysis for Marketing. London, Jun. 2002. vol. 10, Iss. 4; p. 353.*

"If we build it, will they come?" Julie Ritzer-Ross. Nation's Restaurant News. New York: Nov. 7, 2005. vol. 39, Iss. 45; p. S4, 2 pgs.*

The Use of Data in Outlet Locational Planning: A Preliminary Examination Across Retail and Service Sectors J W Byrom. Management Research News. Patrington: 2005. vol. 28, Iss. 5; p. 63, 12 pgs.*

A Multiobjective Approach to Design Franchise Outlet NetworksAuthor(s): John R. Current and James E. StorbeckSource: The Journal of the Operational Research Society, vol. 45, No. 1 (Jan. 1994).*

Retail location analysis with GIS: Seven Strategic Steps, Thrall, Grant Ian, Nov. 1997.*

Determining Potential Markets for a Business Location By Ela Dramowicz , Nova Scotia Community College Feb. 22, 2005.*

Strategic Locational Decision Making of Retailers Classified by Business Kenji Matsui 1-4244-0148-8/06/$20.00 c 2006 IEEE.*

Changing methods of location planning for retail companies Graham Clarke School of Geography, University of Leeds, Leeds LS2 9JT, UK Received May 28, 1998; accepted in revised form Aug. 31, 1998.*

FRANSYS: A Franchise Distribution System Location Model Avuit Ghosh vol. 67 No. 4 Winter 1991.*

Comparative computer approaches to multi-outlet retail site location decisions Moutinho, Luiz; Curry, Bruce; Davies, Fiona Service Industries Journal vI3n4 pp. 201-220 Oct. 1993.*

Small independent retail firms and loactional decision-making: outdoor leisure retailing by the crags Elke Pioch, John Byrom. Journal of Small Business and Enterprise Development. Bradford: 2004. vol. 11, Iss. 2; p. 222.*

Towards a contemporary perspective of retail location Clarke, Ian, Bennison, David, Pal, John. International Journal of Retail & Distribution Management. Bradford: 1997. vol. 25, Iss.*

The art and science of retail location decisions Tony Hernandez, David Bennison. International Journal of Retail & Distribution Management. Bradford: 2000. vol. 28, Iss. 8; p. 357.*

* cited by examiner

| | A | B | C | D | E | F | G | H | I | J | K | L | M | N | O | P |
|---|---|---|---|---|---|---|---|---|---|---|---|---|---|---|---|---|
| 1 | KEY | POPCY | Retailers | Lottery Sales | LAD | PC Sales | PPGRA | PPGRB | PPGRC | PPGRD | PPGRE | PPGRF | PPGRG | PPGRH | PPGRI | PPGRJ |
| 999 | 45776 | 751 | 1 | $31,450 | 751 | $41.88 | 0 | 0 | 0 | 0 | 0 | 0 | 401 | 0 | 375 | |
| 1000 | 45777 | 8 | 1 | $49,521 | 8 | $6,190.06 | 0 | 0 | 0 | 0 | 0 | 0 | 0 | 0 | 9 | |
| 1001 | 45778 | 1,093 | 1 | $77,566 | 1,093 | $70.97 | 0 | 0 | 0 | 0 | 0 | 0 | 253 | 0 | 753 | |
| 1002 | 45779 | 79 | 1 | $124,219 | 79 | $1,572.39 | 0 | 0 | 0 | 78 | 0 | 0 | 0 | 0 | 0 | |
| 1003 | 45782 | 17 | 1 | $12,287 | 17 | $722.74 | 0 | 0 | 0 | 0 | 0 | 20 | 0 | 0 | 0 | |
| 1004 | 45786 | 3,537 | 1 | $149,993 | 3,537 | $42.41 | 0 | 0 | 20 | 0 | 0 | 0 | 117 | 0 | 3558 | |
| 1005 | 45787 | 22 | 1 | $19,684 | 22 | $894.70 | 0 | 0 | 0 | 0 | 0 | 0 | 0 | 0 | 22 | |
| 1006 | 45789 | 301 | 1 | $11,658 | 301 | $38.73 | 0 | 0 | 0 | 0 | 0 | 0 | 312 | 0 | 0 | |
| 1007 | 45812 | 2,541 | 1 | $390,939 | 2,541 | $153.85 | 0 | 0 | 0 | 0 | 0 | 0 | 0 | 0 | 2392 | |
| 1008 | 45814 | 3,204 | 1 | $156,473 | 3,204 | $48.84 | 0 | 0 | 0 | 0 | 0 | 0 | 0 | 0 | 3162 | |
| 1009 | 45826 | 11 | 1 | $87,834 | 11 | $7,984.93 | 0 | 0 | 0 | 0 | 0 | 0 | 0 | 0 | 11 | |
| 1010 | 45827 | 2,724 | 1 | $10,616 | 2,724 | $3.90 | 0 | 0 | 363 | 0 | 0 | 0 | 0 | 0 | 2356 | |
| 1011 | 45836 | 1,662 | 1 | $186,619 | 1,662 | $112.29 | 0 | 0 | 0 | 0 | 0 | 0 | 0 | 0 | 1679 | |
| 1012 | 45848 | 62 | 1 | $228,008 | 62 | $3,677.54 | 0 | 0 | 0 | 0 | 0 | 0 | 0 | 0 | 62 | |
| 1013 | 45850 | 4,914 | 1 | $6,875 | 4,914 | $1.40 | 0 | 0 | 23 | 0 | 0 | 0 | 0 | 0 | 4827 | |
| 1014 | 45862 | 1,518 | 1 | $418,723 | 1,518 | $275.84 | 0 | 0 | 0 | 0 | 0 | 0 | 0 | 0 | 1505 | |
| 1015 | 45863 | 1,234 | 1 | $94,378 | 1,234 | $76.48 | 0 | 0 | 43 | 0 | 0 | 0 | 0 | 0 | 1231 | |
| 1016 | 45867 | 1,840 | 1 | $14,606 | 1,840 | $7.94 | 0 | 0 | 0 | 0 | 0 | 0 | 0 | 0 | 1206 | |
| 1017 | 45870 | 14 | 1 | $450 | 14 | $32.14 | 0 | 0 | 0 | 0 | 0 | 0 | 0 | 0 | 6 | |
| 1018 | 45871 | 2,020 | 1 | $29,905 | 2,020 | $14.80 | 0 | 0 | 0 | 0 | 0 | 0 | 0 | 0 | 2059 | |
| 1019 | 45874 | 2,485 | 1 | $109,826 | 2,485 | $44.20 | 0 | 0 | 0 | 0 | 0 | 0 | 0 | 0 | 2449 | |
| 1020 | 45876 | 16 | 1 | $206,118 | 16 | $12,882.36 | 0 | 0 | 0 | 0 | 0 | 0 | 0 | 0 | 16 | |
| 1021 | 45877 | 2,126 | 1 | $70,868 | 2,126 | $33.33 | 0 | 0 | 0 | 0 | 0 | 0 | 0 | 0 | 2120 | |
| 1022 | 45880 | 2,396 | 1 | $235,374 | 2,396 | $98.24 | 0 | 0 | 0 | 0 | 0 | 0 | 0 | 0 | 2409 | |
| 1023 | | | | | | | | | | | | | | | | |
| 1024 | 43016 | 771 | 0 | $0 | | $0.00 | 0 | 0 | 0 | 0 | 0 | 0 | 463 | 0 | 202 | |
| 1025 | 43022 | 3,786 | 0 | $0 | | $0.00 | 0 | 0 | 154 | 0 | 0 | 0 | 0 | 0 | 1279 | |
| 1026 | 43027 | 99 | 0 | $0 | | $0.00 | 0 | 0 | 0 | 0 | 0 | 0 | 0 | 0 | 106 | |
| 1027 | 43029 | 539 | 0 | $0 | | $0.00 | 0 | 0 | 333 | 0 | 0 | 0 | 0 | 0 | 204 | |
| 1028 | 43033 | 51 | 0 | $0 | | $0.00 | 0 | 0 | 0 | 0 | 0 | 0 | 0 | 0 | 50 | |
| 1029 | 43041 | 0 | 0 | $0 | | | 0 | 0 | 0 | 0 | 0 | 0 | 0 | 0 | 0 | |
| 1030 | 43048 | 12 | 0 | $0 | | | 0 | 0 | 12 | 0 | 0 | 0 | 0 | 0 | 0 | |

FIG. 3

| | A | B | C | D | E | F | G | H | I | J | K | L | M | N | O | P |
|---|---|---|---|---|---|---|---|---|---|---|---|---|---|---|---|---|
| 1 | KEY | POPCY | Retailers | Lottery Sales | LAD | PC Sales | PPGRA | PPGRB | PPGRC | PPGRD | PPGRE | PPGRF | PPGRG | PPGRH | PPGRI | PPGRJ |
| 226 | 45147 | 25 | 2 | $199,011 | 13 | $7,960.44 | 25 | 0 | 0 | 0 | 0 | 0 | 0 | 0 | 0 | |
| 227 | 44065 | 4,602 | 6 | $1,292,151 | 767 | $280.78 | 20 | 0 | 3618 | 0 | 0 | 0 | 0 | 0 | 872 | |
| 228 | 43102 | 4,269 | 2 | $298,540 | 2,135 | $69.93 | 19 | 0 | 0 | 0 | 0 | 0 | 0 | 0 | 4167 | |
| 229 | 44442 | 3,300 | 5 | $687,808 | 660 | $208.43 | 17 | 0 | 386 | 0 | 0 | 929 | 0 | 0 | 1958 | |
| 230 | 43952 | 18,982 | 36 | $8,742,771 | 527 | $460.58 | 15 | 0 | 645 | 5087 | 0 | 5907 | 0 | 0 | 1254 | 65 |
| 231 | 43001 | 1,735 | 3 | $200,506 | 578 | $115.57 | 14 | 0 | 1694 | 0 | 0 | 0 | 0 | 0 | 0 | |
| 232 | 44130 | 51,680 | 63 | $16,687,519 | 820 | $322.90 | 11 | 4382 | 18743 | 0 | 6028 | 16448 | 0 | 4561 | 1476 | |
| 233 | 45301 | 11 | 1 | $121,529 | 11 | $11,048.07 | 11 | 0 | 0 | 0 | 0 | 0 | 0 | 0 | 0 | |
| 234 | 45005 | 33,917 | 37 | $6,001,839 | 917 | $176.96 | 10 | 6478 | 6641 | 2627 | 0 | 12871 | 0 | 1577 | 272 | |
| 235 | 43204 | 39,369 | 42 | $7,681,512 | 937 | $195.12 | 8 | 3509 | 2334 | 14451 | 0 | 12980 | 0 | 3080 | 12 | |
| 236 | 44114 | 3,818 | 39 | $10,502,570 | 98 | $2,750.80 | 8 | 0 | 0 | 51 | 0 | 0 | 0 | 0 | 0 | 20 |
| 237 | 44310 | 23,751 | 35 | $7,138,021 | 679 | $300.54 | 1 | 0 | 0 | 2932 | 0 | 11263 | 0 | 0 | 1521 | 39 |
| 238 | | | | | | | | | | | | | | | | |
| 239 | 44701 | 55,767 | 82 | $12,936,228 | 680 | $231.97 | 0 | 0 | 5128 | 25471 | 0 | 6922 | 0 | 0 | 16725 | |
| 240 | 44105 | 52,325 | 76 | $21,686,691 | 688 | $414.46 | 0 | 0 | 72 | 14673 | 0 | 3578 | 0 | 10425 | 0 | 133 |
| 241 | 44111 | 40,609 | 73 | $16,396,028 | 556 | $403.75 | 0 | 2473 | 958 | 4074 | 2360 | 25545 | 0 | 0 | 940 | |
| 242 | 44102 | 49,593 | 72 | $13,740,159 | 689 | $277.06 | 0 | 0 | 0 | 7785 | 853 | 1418 | 0 | 3601 | 0 | |
| 243 | 44870 | 42,302 | 66 | $14,003,469 | 641 | $331.04 | 0 | 4335 | 5284 | 9645 | 3472 | 11434 | 0 | 0 | 3675 | 97 |
| 244 | 44109 | 43,545 | 63 | $13,739,655 | 691 | $315.53 | 0 | 1777 | 138 | 4084 | 906 | 16752 | 0 | 0 | 0 | 16 |
| 245 | 43207 | 46,042 | 62 | $13,810,852 | 743 | $299.96 | 0 | 1272 | 1180 | 6244 | 626 | 25083 | 0 | 1362 | 0 | 19 |
| 246 | 45601 | 54,307 | 57 | $9,379,868 | 953 | $172.72 | 0 | 0 | 990 | 13410 | 0 | 4672 | 3225 | 0 | 26074 | |
| 247 | 44112 | 31,722 | 52 | $15,336,422 | 610 | $483.46 | 0 | 0 | 0 | 0 | 1654 | 711 | 0 | 7410 | 0 | 178 |
| 248 | 43229 | 45,063 | 51 | $8,664,219 | 884 | $192.27 | 0 | 8054 | 2297 | 0 | 1537 | 16406 | 0 | 11586 | 1406 | |
| 249 | 43612 | 30,936 | 50 | $12,883,332 | 619 | $416.45 | 0 | 0 | 527 | 1485 | 753 | 26723 | 0 | 0 | 0 | 16 |
| 250 | 44052 | 32,715 | 49 | $11,843,488 | 668 | $362.02 | 0 | 0 | 3180 | 12095 | 0 | 10656 | 0 | 0 | 0 | |
| 251 | 44134 | 38,265 | 48 | $15,838,096 | 797 | $413.91 | 0 | 3800 | 14827 | 0 | 0 | 19966 | 0 | 0 | 0 | |
| 252 | 44515 | 27,867 | 47 | $12,550,197 | 593 | $450.36 | 0 | 5812 | 3234 | 11452 | 717 | 12485 | 0 | 0 | 0 | 5 |
| 253 | 43223 | 27,109 | 46 | $7,629,339 | 589 | $281.43 | 0 | 3325 | 0 | 0 | 2071 | 6453 | 0 | 0 | 8091 | 25 |
| 254 | 43302 | 54,544 | 45 | $9,505,318 | 1,212 | $174.27 | 0 | 0 | 3406 | 31719 | 0 | 2363 | 0 | 0 | 1604 | 7 |
| 255 | 44512 | 33,643 | 44 | $10,842,849 | 765 | $322.29 | 0 | 7185 | 3063 | 0 | 5125 | 17047 | 0 | 0 | 0 | |
| 256 | 45662 | 28,584 | 44 | $5,803,204 | 650 | $203.02 | 0 | 0 | 0 | 11214 | 0 | 7861 | 0 | 0 | 4626 | 137 |

| | G1445 | | fx | =AVERAGE($F$2:$F$48) | | | | | | | | | | | | |
|---|---|---|---|---|---|---|---|---|---|---|---|---|---|---|---|---|
| | A | B | C | D | E | F | G | H | I | J | K | L | M | N | O | P |
| 1 | KEY | POPCY | Retailers | Lottery Sales | LAD | PC Sales | PPGRA | PPGRB | PPGRC | PPGRD | PPGRE | PPGRF | PPGRG | PPGRH | PPGRI | PPGRJ |
| 1415 | 45815 | 0 | 0 | | $0 | | 0 | 0 | 0 | 0 | 0 | 0 | 0 | 0 | 0 | |
| 1416 | 45816 | 10 | 0 | | $0 | $0.00 | 0 | 0 | 0 | 0 | 0 | 0 | 0 | 0 | 0 | |
| 1417 | 45819 | 126 | 0 | | $0 | $0.00 | 0 | 0 | 0 | 0 | 0 | 0 | 0 | 0 | 130 | |
| 1418 | 45820 | 5 | 0 | | $0 | $0.00 | 0 | 0 | 0 | 0 | 0 | 0 | 0 | 0 | 5 | |
| 1419 | 45835 | 380 | 0 | | $0 | $0.00 | 0 | 0 | 0 | 0 | 0 | 0 | 0 | 0 | 381 | |
| 1420 | 45837 | 22 | 0 | | $0 | $0.00 | 0 | 0 | 0 | 0 | 0 | 0 | 0 | 0 | 21 | |
| 1421 | 45838 | 0 | 0 | | $0 | | 0 | 0 | 0 | 0 | 0 | 0 | 0 | 0 | 0 | |
| 1422 | 45839 | 0 | 0 | | $0 | $0.00 | 0 | 0 | 0 | 0 | 0 | 0 | 0 | 0 | 0 | |
| 1423 | 45841 | 684 | 0 | | $0 | $0.00 | 0 | 0 | 0 | 0 | 0 | 0 | 0 | 0 | 679 | |
| 1424 | 45844 | 4,379 | 0 | | $0 | $0.00 | 0 | 0 | 965 | 0 | 0 | 0 | 0 | 0 | 3466 | |
| 1425 | 45849 | 1,222 | 0 | | $0 | $0.00 | 0 | 0 | 0 | 0 | 0 | 0 | 0 | 0 | 1232 | |
| 1426 | 45851 | 631 | 0 | | $0 | $0.00 | 0 | 0 | 0 | 0 | 0 | 0 | 0 | 0 | 638 | |
| 1427 | 45855 | 15 | 0 | | $0 | $0.00 | 0 | 0 | 0 | 0 | 0 | 0 | 0 | 0 | 15 | |
| 1428 | 45859 | 31 | 0 | | $0 | $0.00 | 0 | 0 | 0 | 0 | 0 | 0 | 0 | 0 | 31 | |
| 1429 | 45860 | 2,167 | 0 | | $0 | $0.00 | 0 | 0 | 0 | 0 | 0 | 0 | 0 | 0 | 2294 | |
| 1430 | 45861 | 11 | 0 | | $0 | $0.00 | 0 | 0 | 0 | 0 | 0 | 0 | 0 | 0 | 11 | |
| 1431 | 45866 | 30 | 0 | | $0 | $0.00 | 0 | 0 | 0 | 0 | 0 | 0 | 0 | 0 | 29 | |
| 1432 | 45868 | 781 | 0 | | $0 | $0.00 | 0 | 0 | 101 | 0 | 0 | 0 | 0 | 0 | 679 | |
| 1433 | 45881 | 1,217 | 0 | | $0 | $0.00 | 0 | 0 | 103 | 0 | 0 | 0 | 0 | 0 | 1113 | |
| 1434 | 45884 | 0 | 0 | | $0 | $0.00 | 0 | 0 | 0 | 0 | 0 | 0 | 0 | 0 | 0 | |
| 1435 | 45886 | 545 | 0 | | $0 | $0.00 | 0 | 0 | 0 | 0 | 0 | 0 | 0 | 0 | 544 | |
| 1436 | 45888 | 17 | 0 | | $0 | $0.00 | 0 | 0 | 0 | 0 | 0 | 0 | 0 | 0 | 17 | |
| 1437 | 45889 | 1,291 | 0 | | $0 | $0.00 | 0 | 0 | 1274 | 0 | 0 | 0 | 0 | 0 | 0 | |
| 1438 | 45890 | 626 | 0 | | $0 | $0.00 | 0 | 0 | 0 | 0 | 0 | 0 | 0 | 0 | 626 | |
| 1439 | 45893 | 112 | 0 | | $0 | $0.00 | 0 | 0 | 0 | 0 | 0 | 0 | 0 | 0 | 113 | |
| 1440 | 45894 | 716 | 0 | | $0 | $0.00 | 0 | 0 | 0 | 0 | 0 | 0 | 0 | 0 | 717 | |
| 1441 | 45897 | 18 | 0 | | $0 | $0.00 | 0 | 0 | 0 | 0 | 0 | 0 | 0 | 0 | 18 | |
| 1442 | 45899 | 16 | 0 | | $0 | $0.00 | 0 | 0 | 0 | 0 | 0 | 0 | 0 | 0 | 16 | |
| 1443 | 45950 | 6 | 0 | | $0 | $0.00 | 0 | 0 | 0 | 0 | 0 | 0 | 0 | 0 | 4 | |
| 1444 | | | | | | | | | | | | | | | | |
| 1445 | | | | | | | $821.33 | | | | | | | | | |

FIG. 6

G1452  fx  =AVERAGE($E$2:$E$119)

| | A | B | C | D | E | F | G | H | I | J | K | L | M | N | O | P |
|---|---|---|---|---|---|---|---|---|---|---|---|---|---|---|---|---|
| 1 | KEY | POPCY | Retailers | Lottery Sales | LAD | PC Sales | PPGRA | PPGRB | PPGRC | PPGRD | PPGRE | PPGRF | PPGRG | PPGRH | PPGRI | PP |
| 1422 | 45839 | 0 | 0 | | $0 | | | 0 | 0 | 0 | 0 | 0 | 0 | 0 | 0 | 0 |
| 1423 | 45841 | 684 | 0 | | $0 | $0.00 | | 0 | 0 | | 0 | 0 | 0 | 0 | 679 | |
| 1424 | 45844 | 4,379 | 0 | | $0 | $0.00 | | 0 | 965 | | 0 | 0 | 0 | 0 | 3466 | |
| 1425 | 45849 | 1,222 | 0 | | $0 | $0.00 | | 0 | 0 | | 0 | 0 | 0 | 0 | 1232 | |
| 1426 | 45851 | 631 | 0 | | $0 | $0.00 | | 0 | 0 | | 0 | 0 | 0 | 0 | 638 | |
| 1427 | 45855 | 15 | 0 | | $0 | $0.00 | | 0 | 0 | | 0 | 0 | 0 | 0 | 15 | |
| 1428 | 45859 | 31 | 0 | | $0 | $0.00 | | 0 | 0 | | 0 | 0 | 0 | 0 | 31 | |
| 1429 | 45860 | 2,167 | 0 | | $0 | $0.00 | | 0 | 0 | | 0 | 0 | 0 | 0 | 2294 | |
| 1430 | 45861 | 11 | 0 | | $0 | $0.00 | | 0 | 0 | | 0 | 0 | 0 | 0 | 11 | |
| 1431 | 45866 | 30 | 0 | | $0 | $0.00 | | 0 | 101 | | 0 | 0 | 0 | 0 | 29 | |
| 1432 | 45868 | 781 | 0 | | $0 | $0.00 | | 0 | 103 | | 0 | 0 | 0 | 0 | 679 | |
| 1433 | 45881 | 1,217 | 0 | | $0 | $0.00 | | 0 | 0 | | 0 | 0 | 0 | 0 | 1113 | |
| 1434 | 45884 | 0 | 0 | | $0 | | | 0 | 0 | | 0 | 0 | 0 | 0 | 0 | |
| 1435 | 45886 | 545 | 0 | | $0 | $0.00 | | 0 | 0 | | 0 | 0 | 0 | 0 | 544 | |
| 1436 | 45888 | 17 | 0 | | $0 | $0.00 | | 0 | 0 | | 0 | 0 | 0 | 0 | 17 | |
| 1437 | 45889 | 1,291 | 0 | | $0 | $0.00 | | 0 | 1274 | | 0 | 0 | 0 | 0 | 0 | |
| 1438 | 45890 | 626 | 0 | | $0 | $0.00 | | 0 | 0 | | 0 | 0 | 0 | 0 | 626 | |
| 1439 | 45893 | 112 | 0 | | $0 | $0.00 | | 0 | 0 | | 0 | 0 | 0 | 0 | 113 | |
| 1440 | 45894 | 716 | 0 | | $0 | $0.00 | | 0 | 0 | | 0 | 0 | 0 | 0 | 717 | |
| 1441 | 45897 | 18 | 0 | | $0 | $0.00 | | 0 | 0 | | 0 | 0 | 0 | 0 | 18 | |
| 1442 | 45899 | 16 | 0 | | $0 | $0.00 | | 0 | 0 | | 0 | 0 | 0 | 0 | 16 | |
| 1443 | 45950 | 6 | 0 | | $0 | $0.00 | | 0 | 0 | | 0 | 0 | 0 | 0 | 4 | |
| 1444 | | | | | | | | | | | | | | | | |
| 1445 | 237 | | | Q1 PC Sales | 48 | $821.33 | | | | | | | | | | |
| 1446 | | | | Q1 LAD | 48 | 738 | | | | | | | | | | |
| 1447 | | | | Q2 PC Sales | 95 | $513.51 | | | | | | | | | | |
| 1448 | | | | Q2 LAD | 95 | 908 | | | | | | | | | | |
| 1449 | | | | Q2 PC Sales | 143 | $390.80 | | | | | | | | | | |
| 1450 | | | | Q2 LAD | 143 | 1,074 | | | | | | | | | | |
| 1451 | | | | 50% PC Sales | 119 | $442.30 | | | | | | | | | | |
| 1452 | | | | 50% LAD | 119 | 985 | | | | | | | | | | |
| 1453 | | | | | | | | | | | | | | | | |

FIG. 7

|     |       |        |              |        |           |        |       |      |     |      |      |      |
| --- | ----- | ------ | ------------ | ------ | --------- | ------ | ----- | ---- | --- | ---- | ---- | ---- |
| 230 | 44149 | 17,065 | 5  | $849,693     | 3,413  | $49.79    | 14070 | 2291  | 0    | 0   | 711  | 0    | 0    |
| 231 | 43214 | 25,176 | 15 | $1,207,243   | 1,678  | $47.95    | 750   | 15606 | 0    | 0   | 39   | 2196 | 48   | 2311 | 287C |
| 232 | 45039 | 16,775 | 5  | $802,402     | 3,355  | $47.83    | 2366  | 10926 | 1034 | 0   | 0    | 319  | 1916 | 125  |
| 233 | 43065 | 31,385 | 11 | $1,470,173   | 2,853  | $46.84    | 23927 | 2628  | 815  | 0   | 0    | 0    | 2018 | 0    |
| 234 | 44321 | 12,007 | 2  | $526,701     | 6,004  | $43.87    | 3108  | 2020  | 1965 | 0   | 0    | 0    | 4762 | 0    |
| 235 | 44140 | 15,220 | 8  | $642,351     | 1,903  | $42.20    | 8650  | 6007  | 710  | 0   | 0    | 0    | 0    | 0    |
| 236 | 43221 | 29,604 | 8  | $1,027,698   | 3,701  | $34.71    | 13016 | 8813  | 2799 | 0   | 876  | 361  | 3627 | 596  | 41 |
| 237 | 43023 | 12,107 | 4  | $348,677     | 3,027  | $28.80    | 4182  | 839   | 3652 | 0   | 0    | 0    | 0    | 0    |
| 238 | 44216 | 8,778  | 2  | $229,545     | 4,389  | $26.15    | 693   | 586   | 7516 | 0   | 0    | 0    | 0    | 54   |
| 239 | 43016 | 23,408 | 2  | $540,879     | 11,704 | $23.11    | 8132  | 1027  | 27   | 0   | 0    | 0    | 11657| 472  |
| 240 | 43119 | 24,393 | 6  | $406,430     | 4,066  | $16.66    | 4604  | 1585  | 11903| 0   | 0    | 5903 | 321  | 251  |
| 241 | 45458 | 25,944 | 5  | $298,365     | 5,189  | $11.50    | 16522 | 3034  | 257  | 80  | 0    | 0    | 7916 | 0    |
| 242 | 45315 | 3,887  | 2  | $31,303      | 1,944  | $8.05     | 2227  | 1082  | 121  | 0   | 0    | 398  | 0    | 97   |
| 243 | 45208 | 16,535 | 2  | $35,640      | 8,268  | $2.16     | 2126  | 4828  | 0    | 51  | 0    | 201  | 7151 | 1480 |
| 244 |       |        |    |              |        |           |       |       |      |     |      |      |      |      |
| 245 | 45301 | 11     | 1  | $121,529     | 11     | $11,048.07| 11    | 0     | 0    | 0   | 0    | 0    | 0    | 0    |
| 246 | 45147 | 25     | 2  | $199,011     | 13     | $7,960.44 | 25    | 0     | 0    | 0   | 0    | 0    | 0    | 0    |
| 247 | 44114 | 3,818  | 39 | $10,502,570  | 98     | $2,750.80 | 8     | 0     | 0    | 0   | 0    | 0    | 0    | 0    |
| 248 | 45228 | 458    | 1  | $576,760     | 458    | $1,259.30 | 453   | 0     | 0    | 0   | 0    | 0    | 0    | 0    | 201 |

FIG. 8

H1452  fx =AVERAGE($E$2:$E$122)

| | A | B | C | D | E | F | G | H | I | J | K | L | M | N | O | P |
|---|---|---|---|---|---|---|---|---|---|---|---|---|---|---|---|---|
| 1 | KEY | POPCY | Retailers | Lottery Sales | LAD | PC Sales | PPGRA | PPGRB | PPGRC | PPGRD | PPGRE | PPGRF | PPGRG | PPGRH | PPGRI | PPGR |
| 1422 | 45839 | 0 | 0 | | $0 | $0.00 | 0 | 0 | 0 | 0 | 0 | 0 | 0 | 0 | 0 | |
| 1423 | 45841 | 684 | 0 | | $0 | $0.00 | 0 | 0 | 0 | 0 | 0 | 0 | 0 | 0 | 679 | |
| 1424 | 45844 | 4,379 | 0 | | $0 | $0.00 | 0 | 0 | 965 | 0 | 0 | 0 | 0 | 0 | 3466 | |
| 1425 | 45849 | 1,222 | 0 | | $0 | $0.00 | 0 | 0 | 0 | 0 | 0 | 0 | 0 | 0 | 1232 | |
| 1426 | 45851 | 631 | 0 | | $0 | $0.00 | 0 | 0 | 0 | 0 | 0 | 0 | 0 | 0 | 638 | |
| 1427 | 45855 | 15 | 0 | | $0 | $0.00 | 0 | 0 | 0 | 0 | 0 | 0 | 0 | 0 | 15 | |
| 1428 | 45859 | 31 | 0 | | $0 | $0.00 | 0 | 0 | 0 | 0 | 0 | 0 | 0 | 0 | 31 | |
| 1429 | 45860 | 2,167 | 0 | | $0 | $0.00 | 0 | 0 | 0 | 0 | 0 | 0 | 0 | 0 | 2294 | |
| 1430 | 45861 | 11 | 0 | | $0 | $0.00 | 0 | 0 | 0 | 0 | 0 | 0 | 0 | 0 | 11 | |
| 1431 | 45866 | 30 | 0 | | $0 | $0.00 | 0 | 0 | 0 | 0 | 0 | 0 | 0 | 0 | 29 | |
| 1432 | 45868 | 781 | 0 | | $0 | $0.00 | 0 | 0 | 101 | 0 | 0 | 0 | 0 | 0 | 679 | |
| 1433 | 45881 | 1,217 | 0 | | $0 | $0.00 | 0 | 0 | 103 | 0 | 0 | 0 | 0 | 0 | 1113 | |
| 1434 | 45884 | 0 | 0 | | $0 | $0.00 | 0 | 0 | 0 | 0 | 0 | 0 | 0 | 0 | 0 | |
| 1435 | 45886 | 545 | 0 | | $0 | $0.00 | 0 | 0 | 0 | 0 | 0 | 0 | 0 | 0 | 544 | |
| 1436 | 45888 | 17 | 0 | | $0 | $0.00 | 0 | 0 | 0 | 0 | 0 | 0 | 0 | 0 | 17 | |
| 1437 | 45889 | 1,291 | 0 | | $0 | $0.00 | 0 | 0 | 1274 | 0 | 0 | 0 | 0 | 0 | 0 | |
| 1438 | 45890 | 626 | 0 | | $0 | $0.00 | 0 | 0 | 0 | 0 | 0 | 0 | 0 | 0 | 626 | |
| 1439 | 45893 | 112 | 0 | | $0 | $0.00 | 0 | 0 | 0 | 0 | 0 | 0 | 0 | 0 | 113 | |
| 1440 | 45894 | 716 | 0 | | $0 | $0.00 | 0 | 0 | 0 | 0 | 0 | 0 | 0 | 0 | 717 | |
| 1441 | 45897 | 18 | 0 | | $0 | $0.00 | 0 | 0 | 0 | 0 | 0 | 0 | 0 | 0 | 18 | |
| 1442 | 45899 | 16 | 0 | | $0 | $0.00 | 0 | 0 | 0 | 0 | 0 | 0 | 0 | 0 | 16 | |
| 1443 | 45950 | 6 | 0 | | $0 | $0.00 | 0 | 0 | 0 | 0 | 0 | 0 | 0 | 0 | 4 | |
| 1444 | | | | | | | | | | | | | | | | |
| 1445 | 243 | | | Q1 PC Sales | 49 | $821.33 | $496.36 | | | | | | | | | |
| 1446 | | | | Q1 LAD | 49 | 738 | 791 | | | | | | | | | |
| 1447 | | | | Q2 PC Sales | 98 | $513.51 | $353.10 | | | | | | | | | |
| 1448 | | | | Q2 LAD | 98 | 908 | 934 | | | | | | | | | |
| 1449 | | | | Q2 PC Sales | 146 | $390.80 | $291.13 | | | | | | | | | |
| 1450 | | | | Q2 LAD | 146 | 1,074 | 1,045 | | | | | | | | | |
| 1451 | | | | 50% PC Sales | 122 | $442.30 | $318.15 | | | | | | | | | |
| 1452 | | | | 50% LAD | 122 | 985 | 985 | | | | | | | | | |
| 1453 | | | | | | | | | | | | | | | | |

FIG. 9

| | A | B | C | D | E | F | BS | BT | BU | BV | BW | BX | BY | BZ | CA |
|---|---|---|---|---|---|---|---|---|---|---|---|---|---|---|---|
| 1 | KEY | POPCY | Retailers | Lottery Sales | LAD | PC Sales | PPK02 | PPK03 | PPK04 | PPK05 | PPK06 | PPL01 | PPL02 | PPL03 | |
| 1421 | 45839 | 0 | 0 | $0 | | $0.00 | | | | | | | | | 0 |
| 1422 | 45841 | 684 | 0 | $0 | | $0.00 | | | | | | | | | 0 |
| 1423 | 45844 | 4,379 | 0 | $0 | | $0.00 | | | | | | | | | 0 |
| 1424 | 45849 | 1,222 | 0 | $0 | | $0.00 | | | | | | | | | 0 |
| 1425 | 45851 | 631 | 0 | $0 | | $0.00 | | | | | | | | | 0 |
| 1426 | 45855 | 15 | 0 | $0 | | $0.00 | | | | | | | | | 0 |
| 1427 | 45859 | 31 | 0 | $0 | | $0.00 | | | | | | | | | 0 |
| 1428 | 45860 | 2,167 | 0 | $0 | | $0.00 | | | | | | | | | 0 |
| 1429 | 45861 | 11 | 0 | $0 | | $0.00 | | | | | | | | | 0 |
| 1430 | 45866 | 30 | 0 | $0 | | $0.00 | | | | | | | | | 0 |
| 1431 | 45868 | 781 | 0 | $0 | | $0.00 | | | | | | | | | 0 |
| 1432 | 45881 | 1,217 | 0 | $0 | | $0.00 | | | | | | | | | 0 |
| 1433 | 45884 | 0 | 0 | $0 | | $0.00 | | | | | | | | | 0 |
| 1434 | 45886 | 545 | 0 | $0 | | $0.00 | | | | | | | | | 0 |
| 1435 | 45888 | 17 | 0 | $0 | | $0.00 | | | | | | | | | 0 |
| 1436 | 45889 | 1,291 | 0 | $0 | | $0.00 | | | | | | | | | 0 |
| 1437 | 45890 | 626 | 0 | $0 | | $0.00 | | | | | | | | | 0 |
| 1438 | 45893 | 112 | 0 | $0 | | $0.00 | | | | | | | | | 0 |
| 1439 | 45894 | 716 | 0 | $0 | | $0.00 | | | | | | | | | 0 |
| 1440 | 45897 | 18 | 0 | $0 | | $0.00 | | | | | | | | | 0 |
| 1441 | 45899 | 16 | 0 | $0 | | $0.00 | | | | | | | | | 0 |
| 1442 | 45950 | 6 | 0 | $0 | | $0.00 | | | | | | | | | 2 |
| 1443 | | | | | | | | | | | | | | | |
| 1444 | | 243 | | | Q1 PC Sales | 49 | $4,331.29 | $568.90 | $391.03 | $586.14 | $5,072.29 | $175.07 | $738.34 | $107.27 | |
| 1445 | | | | | Q1 LAD | 49 | 607 | 600 | 725 | 541 | 540 | 956 | 636 | 1,561 | |
| 1446 | | | | | Q2 PC Sales | 98 | $2,263.92 | $475.90 | $329.07 | $440.03 | $2,760.44 | $175.07 | $483.33 | $172.84 | |
| 1447 | | | | | Q2 LAD | 98 | 752 | 778 | 794 | 700 | 703 | 956 | 885 | 1,502 | |
| 1448 | | | | | Q2 PC Sales | 146 | $1,660.55 | $419.86 | $291.79 | $367.18 | $1,917.85 | $175.07 | $378.06 | $227.72 | |
| 1449 | | | | | Q2 LAD | 146 | 915 | 846 | 887 | 806 | 746 | 956 | 949 | 1,431 | |
| 1450 | | | | | 50% PC Sales | 122 | $1,912.60 | $441.80 | $307.87 | $399.24 | $2,255.94 | $175.07 | $415.26 | $211.41 | |
| 1451 | | | | | 50% LAD | 122 | 844 | 837 | 838 | 744 | 725 | 956 | 939 | 1,401 | |

FIG. 10

G1454    fx  =G1445=TopQ1!G1444

| | A | B | C | D | E | F | G | H | I | J | K | L | M | N | O |
|---|---|---|---|---|---|---|---|---|---|---|---|---|---|---|---|
| 1 | KEY | POPCY | Retailers | Lottery Sales | LAD | PC Sales | PPGRA | PPGRB | PPGRC | PPGRD | PPGRE | PPGRF | PPGRG | PPGRH | PI |
| 1432 | 45868 | 781 | 0 | $0 | | $0.00 | 0 | 0 | 101 | 0 | 0 | 0 | 0 | 0 | 0 |
| 1433 | 45881 | 1,217 | 0 | $0 | | $0.00 | 0 | 0 | 103 | 0 | 0 | 0 | 0 | 0 | 0 |
| 1434 | 45884 | 0 | 0 | $0 | | | | | | | | | | | |
| 1435 | 45886 | 545 | 0 | $0 | | $0.00 | 0 | 0 | 0 | 0 | 0 | 0 | 0 | 0 | 0 |
| 1436 | 45888 | 17 | 0 | $0 | | $0.00 | 0 | 0 | 0 | 0 | 0 | 0 | 0 | 0 | 0 |
| 1437 | 45889 | 1,291 | 0 | $0 | | $0.00 | 0 | 0 | 1274 | 0 | 0 | 0 | 0 | 0 | 0 |
| 1438 | 45890 | 626 | 0 | $0 | | $0.00 | 0 | 0 | 0 | 0 | 0 | 0 | 0 | 0 | 0 |
| 1439 | 45893 | 112 | 0 | $0 | | $0.00 | 0 | 0 | 0 | 0 | 0 | 0 | 0 | 0 | 0 |
| 1440 | 45894 | 716 | 0 | $0 | | $0.00 | 0 | 0 | 0 | 0 | 0 | 0 | 0 | 0 | 0 |
| 1441 | 45897 | 18 | 0 | $0 | | $0.00 | 0 | 0 | 0 | 0 | 0 | 0 | 0 | 0 | 0 |
| 1442 | 45899 | 16 | 0 | $0 | | $0.00 | 0 | 0 | 0 | 0 | 0 | 0 | 0 | 0 | 0 |
| 1443 | 45950 | 6 | 0 | $0 | | $0.00 | 0 | 0 | 0 | 0 | 0 | 0 | 0 | 0 | 0 |
| 1444 | | | | | | | | | | | | | | | |
| 1445 | | 237 | | | Q1 PC Sales | 48 | $821.33 | $11,048.07 | $11,048.07 | $11,048.07 | $11,048.07 | $11,048.07 | $11,048.07 | $11,048.07 | $ |
| 1446 | | | | | Q1 LAD | 48 | 738 | 11 | 11 | 11 | 11 | 11 | 11 | 11 | 11 |
| 1447 | | | | | Q2 PC Sales | 95 | $513.51 | $9,504.25 | $9,504.25 | $9,504.25 | $9,504.25 | $9,504.25 | $9,504.25 | $9,504.25 | |
| 1448 | | | | | Q2 LAD | 95 | 908 | 12 | 12 | 12 | 12 | 12 | 12 | 12 | 12 |
| 1449 | | | | | Q2 PC Sales | 143 | $390.80 | $7,253.10 | $7,253.10 | $7,253.10 | $7,253.10 | $7,253.10 | $7,253.10 | $7,253.10 | |
| 1450 | | | | | Q2 LAD | 143 | 1,074 | 40 | 40 | 40 | 40 | 40 | 40 | 40 | 40 |
| 1451 | | | | | 50% PC Sales | 119 | $442.30 | $7,253.10 | $7,253.10 | $7,253.10 | $7,253.10 | $7,253.10 | $7,253.10 | $7,253.10 | |
| 1452 | | | | | 50% LAD | 119 | 985 | 40 | 40 | 40 | 40 | 40 | 40 | 40 | 40 |
| 1453 | | | | | | | | | | | | | | | |
| 1454 | | | | | | | TRUE | FALSE | FALSE | FALSE | FALSE | FALSE | FALSE | FALSE | |
| 1455 | | | | | | | TRUE | FALSE | FALSE | FALSE | FALSE | FALSE | FALSE | FALSE | |
| 1456 | | | | | | | TRUE | FALSE | FALSE | FALSE | FALSE | FALSE | FALSE | FALSE | |
| 1457 | | | | | | | TRUE | FALSE | FALSE | FALSE | FALSE | FALSE | FALSE | FALSE | |
| 1458 | | | | | | | TRUE | FALSE | FALSE | FALSE | FALSE | FALSE | FALSE | FALSE | |
| 1459 | | | | | | | TRUE | FALSE | FALSE | FALSE | FALSE | FALSE | FALSE | FALSE | |
| 1460 | | | | | | | TRUE | FALSE | FALSE | FALSE | FALSE | FALSE | FALSE | FALSE | |
| 1461 | | | | | | | TRUE | FALSE | FALSE | FALSE | FALSE | FALSE | FALSE | FALSE | |
| 1462 | | | | | | | | | | | | | | | |
| 1463 | | | | | | | | | | | | | | | |

TopQData / TopQ1 / TopQ2

| | A | B | C | D | E | F | G | H | I | J | K | L | M | N | O | P |
|---|---|---|---|---|---|---|---|---|---|---|---|---|---|---|---|---|
| 1 | KEY | POPCY | Retailers | Lottery Sales | LAD | PC Sales | PPGRA | PPGRB | PPGRC | PPGRD | PPGRE | PPGRF | PPGRG | PPGRH | PPGRI | PPGRJ |
| 2 | 43001 | 1,735 | 3 | $200,506 | 578 | $115.57 | 444.0 | 0 | 2.587248 | 0 | 0 | 0 | 0 | 0 | 0 | 0 |
| 3 | 43002 | 21 | 1 | $64,452 | 21 | $3,069.14 | 0 | 0 | 0 | 0 | 0 | 0 | 0 | 0 | 0.044472 | 0 |
| 4 | 43003 | 3,559 | 1 | $302,511 | 3,559 | $85.00 | 0 | 0 | 0.513173 | 0 | 0 | 0 | 0 | 0 | 6.306622 | 0 |
| 5 | 43004 | 13,131 | 1 | $96,869 | 13,131 | $7.38 | 7.3839 | 0 | 7.108059 | 0 | 0 | 0 | 0 | 0.8246 | 0 | 0 |
| 6 | 43005 | 27 | 3 | $126,690 | 9 | $4,692.22 | 0 | 0 | 0 | 0 | 0 | 0 | 0 | 0 | 0.055061 | 0 |
| 7 | 43006 | 771 | 0 | $0 | | $0.00 | 0 | 0 | 0 | 0 | 0 | 0 | 0.731007 | 0 | 0.427783 | 0 |
| 8 | 43007 | 51 | 1 | $148,586 | 51 | $2,913.46 | 0 | 0 | 0 | 0 | 0 | 0 | 0 | 0 | 0 | 0 |
| 9 | 43008 | 1,026 | 4 | $1,006,772 | 257 | $981.26 | 0 | 0 | 0 | 1.694001 | 0 | 0.07458 | 0 | 0 | 0 | 0 |
| 10 | 43009 | 1,694 | 1 | $39,808 | 1,694 | $23.50 | 0 | 0 | 0 | 0 | 0 | 0.036559 | 0 | 0 | 3.502738 | 0 |
| 11 | 43010 | 58 | 1 | $40,411 | 58 | $696.75 | 0 | 0 | 0 | 0 | 0 | 0 | 0 | 0 | 0.122829 | 0 |
| 12 | 43011 | 6,836 | 3 | $329,351 | 2,279 | $48.18 | 0 | 0 | 5.782361 | 0 | 0 | 0 | 0 | 0 | 6.135085 | 0 |
| 13 | 43013 | 1,414 | 3 | $84,575 | 471 | $59.81 | 0 | 0 | 0.74685 | 0 | 0 | 0 | 0 | 0 | 1.895375 | 0 |
| 14 | 43014 | 4,219 | 3 | $281,949 | 1,406 | $66.83 | 0 | 0 | 0.061092 | 0 | 0 | 0 | 0 | 0 | 7.327371 | 0 |
| 15 | 43015 | 46,926 | 27 | $5,012,432 | 1,738 | $106.82 | 8.4903 | 12.519 | 13.06606 | 8.464856 | 0 | 7.656327 | 0 | 2.0608 | 11.99698 | 0 |
| 16 | 43016 | 23,408 | 2 | $540,879 | 11,704 | $23.11 | 11.026 | 1.2983 | 0.041237 | 0 | 0 | 0 | 0 | 13.91 | 0.999572 | 0 |
| 17 | 43017 | 37,140 | 23 | $3,469,896 | 1,615 | $93.43 | 31.622 | 4.8014 | 9.750289 | 0 | 0 | 0 | 0 | 3.3006 | 0 | 0 |
| 18 | 43018 | 0 | 1 | $12,100 | 0 | | 0 | 0 | 0 | 0 | 0 | 0 | 0 | 0 | 0 | 0 |
| 19 | 43019 | 9,443 | 5 | $446,885 | 1,889 | $47.32 | 0 | 0 | 0.835434 | 0 | 0 | 1.200589 | 0 | 0 | 17.48616 | 0 |
| 20 | 43021 | 7,414 | 3 | $174,781 | 2,471 | $23.57 | 3.1225 | 0 | 6.743034 | 0 | 0 | 0 | 0 | 0 | 0.364251 | 0 |
| 21 | 43022 | 3,786 | 0 | $0 | | $0.00 | 0 | 0 | 0.235204 | 0 | 0 | 0 | 0 | 0 | 2.708596 | 0 |
| 22 | 43023 | 12,107 | 4 | $348,677 | 3,027 | $28.80 | 5.6701 | 1.0607 | 5.577703 | 0 | 0 | 0.527908 | 0 | 0 | 0 | 0 |
| 23 | 43025 | 7,335 | 10 | $1,863,737 | 734 | $254.09 | 0 | 0 | 1.819015 | 1.549831 | 0 | 4.501114 | 0.860473 | 0 | 3.064366 | 0 |
| 24 | 43026 | 51,662 | 27 | $4,558,743 | 1,913 | $88.24 | 34.611 | 4.4942 | 21.61589 | 0 | 0 | 4.983689 | 0.244722 | 5.9652 | 0.273188 | 0 |
| 25 | 43027 | 99 | 0 | $0 | | $0.00 | 0 | 0 | 0 | 0 | 0 | 0 | 0 | 0 | 0.22448 | 0 |
| 26 | 43028 | 6,320 | 1 | $292,382 | 6,320 | $46.26 | 0 | 0 | 2.442154 | 0 | 0 | 0 | 0 | 0 | 9.862303 | 0 |
| 27 | 43029 | 539 | 0 | $0 | | $0.00 | 0 | 0 | 0.508591 | 0 | 0 | 0 | 0 | 0 | 0.432018 | 0 |
| 28 | 43030 | 39 | 1 | $216,067 | 39 | $5,540.17 | 0 | 0 | 0.058037 | 0 | 0 | 0 | 0 | 0 | 0 | 0 |
| 29 | 43031 | 10,375 | 7 | $1,315,709 | 1,482 | $126.82 | 0 | 0 | 12.53456 | 0 | 0 | 0.978312 | 0 | 0 | 1.355352 | 0 |
| 30 | 43032 | 13 | 1 | $195,646 | 13 | $15,049.69 | 0 | 0 | 0.018328 | 0 | 0 | 0 | 0 | 0 | 0 | 0 |
| 31 | 43033 | 51 | 0 | $0 | | $0.00 | 0 | 0 | 0 | 0 | 0 | 0 | 0 | 0 | 0.105887 | 0 |
| 32 | 43035 | 16,854 | 10 | $1,748,438 | 1,685 | $103.74 | 12.924 | 0 | 2.321497 | 0 | 0 | 1.712412 | 0 | 3.8638 | 0 | 0 |
| 33 | 43036 | 17 | 1 | $22,022 | 17 | $1,295.40 | 0 | 0 | 0 | 0 | 0 | 0 | 0 | 0 | 0.036002 | 0 |

| | A | B | C | D | E | F | G | H | I | J | K | L | M | N | O |
|---|---|---|---|---|---|---|---|---|---|---|---|---|---|---|---|
| | | | | | | | | | Q1 Retailer Forecast Mosaic Cluster | | | | | | |
| | | | | | | | | Q1 Retailer Forecast Mosaic Groups | | | | | | | |
| | | | | | | Q1 Retailer Forecast | | | | | | | | |
| 1 | KEY | POPCY | Retailers | Lottery Sales | LAD | PC Sales | | | | PPGRA | PPGRB | PPGRC | PPGRD | PPGRE | PPGRI |
| 1438 | 45897 | 18 | 0 | $0 | | $0.00 | | 0 | 0 | 0 | 0 | 0 | 0 | 0 | 0 |
| 1439 | 45898 | 1,241 | 2 | $236,289 | 621 | $190.40 | | 2 | 3 | 0 | 0 | 0 | 0 | 0 | 0 |
| 1440 | 45899 | 16 | 0 | $0 | | $0.00 | | 0 | 0 | 0 | 0 | 0 | 0 | 0 | 0 |
| 1441 | 45950 | 6 | 0 | $0 | | $0.00 | | 0 | 0 | 0 | | | | | |
| 1442 | Totals | 11,485,593 | 11,014 | $2,216,733,742 | | | | 17,583 | 18,350 | 16,804 | | | | | |
| 1443 | LAD | | 1,043 | | | | 653 | 653 | 626 | 684 | | | | | |
| 1444 | | | | | | | | | | | | | | | |

| | A | B | C | D | E | F | BU | BV | BW | BX | BY | BZ |
|---|---|---|---|---|---|---|---|---|---|---|---|---|
| | | | | | | | | | | | | BZ1441 =TopQ2IBZ1441*TopQ2IBZ$1443 |
| 1 | KEY | POPCY | Retailers | Lottery Sales | LAD | PC Sales | PPKQ4 | PPKQ5 | PPKQ6 | PPLQ1 | PPLQ2 | PPLQ3 |
| 1411 | 45868 | 781 | 0 | $0 | | $0.00 | $0.00 | $0.00 | $0.00 | $0.00 | $0.00 | $0.00 |
| 1412 | 45869 | 4,065 | 6 | $368,203 | 678 | $90.58 | $0.00 | $0.00 | $0.00 | $0.00 | $0.00 | $0.00 |
| 1413 | 45870 | 14 | 1 | $450 | 14 | $32.14 | $0.00 | $0.00 | $0.00 | $0.00 | $0.00 | $0.00 |
| 1414 | 45871 | 2,020 | 1 | $29,905 | 2,020 | $14.80 | $0.00 | $0.00 | $0.00 | $0.00 | $0.00 | $0.00 |
| 1415 | 45872 | 4,038 | 3 | $681,145 | 1,346 | $168.68 | $0.00 | $0.00 | $0.00 | $0.00 | $0.00 | $0.00 |
| 1416 | 45873 | 2,648 | 3 | $435,577 | 883 | $164.49 | $0.00 | $0.00 | $0.00 | $0.00 | $0.00 | $0.00 |
| 1417 | 45874 | 2,485 | 1 | $109,826 | 2,485 | $44.20 | $0.00 | $0.00 | $0.00 | $0.00 | $0.00 | $0.00 |
| 1418 | 45875 | 11,440 | 9 | $1,205,411 | 1,271 | $105.37 | $0.00 | $0.00 | $0.00 | $0.00 | $0.00 | $0.00 |
| 1419 | 45876 | 16 | 1 | $206,118 | 16 | $12,882.36 | $0.00 | $0.00 | $0.00 | $0.00 | $0.00 | $0.00 |
| 1420 | 45877 | 2,126 | 1 | $70,868 | 2,126 | $33.33 | $0.00 | $0.00 | $0.00 | $0.00 | $0.00 | $0.00 |
| 1421 | 45879 | 6,345 | 8 | $732,935 | 793 | $115.51 | $0.00 | $0.00 | $0.00 | $0.00 | $0.00 | $0.00 |
| 1422 | 45880 | 2,396 | 1 | $235,374 | 2,396 | $98.24 | $0.00 | $0.00 | $0.00 | $0.00 | $0.00 | $0.00 |
| 1423 | 45881 | 1,217 | 0 | $0 | | $0.00 | $0.00 | $0.00 | $0.00 | $0.00 | $0.00 | $0.00 |
| 1424 | 45882 | 3,105 | 2 | $233,745 | 1,553 | $75.28 | $0.00 | $0.00 | $0.00 | $0.00 | $0.00 | $0.00 |
| 1425 | 45883 | 3,968 | 4 | $205,087 | 992 | $51.69 | $0.00 | $0.00 | $0.00 | $0.00 | $0.00 | $0.00 |
| 1426 | 45884 | 0 | 0 | $0 | | $0.00 | $0.00 | $0.00 | $0.00 | $0.00 | $0.00 | $0.00 |
| 1427 | 45885 | 13,244 | 13 | $1,616,320 | 1,019 | $122.04 | $0.00 | $0.00 | $0.00 | $0.00 | $0.00 | $0.00 |
| 1428 | 45886 | 545 | 0 | $0 | | $0.00 | $0.00 | $0.00 | $0.00 | $0.00 | $0.00 | $0.00 |
| 1429 | 45887 | 4,790 | 2 | $583,532 | 2,395 | $121.82 | $0.00 | $0.00 | $0.00 | $0.00 | $0.00 | $0.00 |
| 1430 | 45888 | 17 | 0 | $0 | | $0.00 | $0.00 | $0.00 | $0.00 | $0.00 | $0.00 | $0.00 |
| 1431 | 45889 | 1,291 | 0 | $0 | | $0.00 | $0.00 | $0.00 | $0.00 | $0.00 | $0.00 | $0.00 |
| 1432 | 45890 | 626 | 0 | $0 | | $0.00 | $0.00 | $0.00 | $0.00 | $0.00 | $0.00 | $0.00 |
| 1433 | 45891 | 15,202 | 15 | $2,164,825 | 1,013 | $142.40 | $0.00 | $0.00 | $0.00 | $0.00 | $0.00 | $0.00 |
| 1434 | 45893 | 112 | 0 | $0 | | $0.00 | $0.00 | $0.00 | $0.00 | $0.00 | $0.00 | $0.00 |
| 1435 | 45894 | 716 | 0 | $0 | | $0.00 | $0.00 | $0.00 | $0.00 | $0.00 | $0.00 | $0.00 |
| 1436 | 45895 | 18,445 | 14 | $1,865,551 | 1,318 | $101.14 | $0.00 | $0.00 | $0.00 | $0.00 | $0.00 | $0.00 |
| 1437 | 45896 | 2,780 | 2 | $205,176 | 1,390 | $73.80 | $0.00 | $0.00 | $0.00 | $0.00 | $0.00 | $0.00 |
| 1438 | 45897 | 18 | 0 | $0 | | $0.00 | $0.00 | $0.00 | $0.00 | $0.00 | $0.00 | $0.00 |
| 1439 | 45898 | 1,241 | 2 | $236,289 | 621 | $190.40 | $0.00 | $0.00 | $0.00 | $0.00 | $0.00 | $0.00 |
| 1440 | 45899 | 16 | 0 | $0 | | $0.00 | $0.00 | $0.00 | $0.00 | $0.00 | $0.00 | $0.00 |
| 1441 | 45950 | 6 | 0 | $0 | | $0.00 | $0.00 | $0.00 | $0.00 | $0.00 | $0.00 | $214.54 |
| 1442 | | | | | | | | | | | | |

FIG. 19

G1441  =AVERAGE(SUM(J1441:U1441),SUM(V1441:CC1441))

| | A | B | C | D | E | F | G | H | I | J | K | L |
|---|---|---|---|---|---|---|---|---|---|---|---|---|
| 1 | KEY | POPCY | Retailers | Lottery Sales | LAD | PC Sales | Q1 Sales Forecast | Q1 Sales Forecast Mosaic Groups | Q1 Sales Forecast Mosaic Cluster | PPGRA | PPGRB | PPGRC |
| 1415 | 45872 | 4,038 | 3 | $681,145 | 1,346 | $168.68 | $8,039,173 | $9,452,367 | $6,625,979 | $0.00 | $0.00 | |
| 1416 | 45873 | 2,648 | 3 | $435,577 | 883 | $164.49 | $12,986,096 | $19,260,026 | $6,712,167 | $0.00 | $0.00 | |
| 1417 | 45874 | 2,485 | 1 | $109,826 | 2,485 | $44.20 | $11,678,027 | $17,805,999 | $5,550,055 | $0.00 | $0.00 | $100.38 |
| 1418 | 45875 | 11,440 | 9 | $1,205,411 | 1,271 | $105.37 | $63,289,671 | $61,712,548 | $64,866,794 | $0.00 | $0.00 | $7,128.4 |
| 1419 | 45876 | 16 | 1 | $206,118 | 16 | $12,882.36 | $74,993 | $115,676 | $34,311 | $0.00 | $0.00 | |
| 1420 | 45877 | 2,126 | 1 | $70,868 | 2,126 | $33.33 | $10,138,941 | $15,327,047 | $4,950,835 | $0.00 | $0.00 | |
| 1421 | 45879 | 6,345 | 8 | $732,935 | 793 | $115.51 | $30,260,870 | $30,502,618 | $30,019,121 | $0.00 | $0.00 | |
| 1422 | 45880 | 2,396 | 1 | $235,374 | 2,396 | $98.24 | $11,291,163 | $17,416,442 | $5,165,885 | $0.00 | $0.00 | |
| 1423 | 45881 | 1,217 | 0 | $0 | | $0.00 | $5,575,677 | $8,287,115 | $2,864,240 | $0.00 | $0.00 | $240.4 |
| 1424 | 45882 | 3,105 | 2 | $233,745 | 1,553 | $75.28 | $14,739,305 | $22,303,746 | $7,174,865 | $0.00 | $0.00 | |
| 1425 | 45883 | 3,968 | 4 | $205,087 | 992 | $51.69 | $15,148,084 | $19,722,525 | $10,573,643 | $0.00 | $0.00 | $3,949.3 |
| 1426 | 45884 | 0 | 0 | $0 | | $0.00 | $0 | $0 | $0 | $0.00 | $0.00 | |
| 1427 | 45885 | 13,244 | 13 | $1,616,320 | 1,019 | $122.04 | $40,373,056 | $50,095,252 | $30,650,860 | $0.00 | $0.00 | $581.15 |
| 1428 | 45886 | 545 | 0 | $0 | | $0.00 | $2,615,804 | $3,932,978 | $1,298,630 | $0.00 | $0.00 | |
| 1429 | 45887 | 4,790 | 2 | $583,532 | 2,395 | $121.82 | $22,718,189 | $34,644,911 | $10,791,467 | $0.00 | $0.00 | |
| 1430 | 45888 | 17 | 0 | $0 | | $0.00 | $79,680 | $122,906 | $36,455 | $0.00 | $0.00 | |
| 1431 | 45889 | 1,291 | 2 | $0 | | $0.00 | $3,363,838 | $2,973,676 | $3,753,999 | $0.00 | $0.00 | $2,973.6 |
| 1432 | 45890 | 626 | 0 | $0 | | $0.00 | $2,935,269 | $4,525,817 | $1,344,721 | $0.00 | $0.00 | |
| 1433 | 45891 | 15,202 | 15 | $2,164,825 | 1,013 | $142.40 | $54,923,877 | $53,201,229 | $56,646,525 | $0.00 | $0.00 | $2,509.1 |
| 1434 | 45893 | 112 | 0 | $0 | | $0.00 | $529,639 | $816,961 | $242,318 | $0.00 | $0.00 | |
| 1435 | 45894 | 716 | 0 | $0 | | $0.00 | $3,499,260 | $5,183,723 | $1,814,796 | $0.00 | $0.00 | |
| 1436 | 45895 | 18,445 | 14 | $1,865,551 | 1,318 | $101.14 | $53,216,241 | $64,137,053 | $42,295,428 | $0.00 | $0.00 | $12,940.3 |
| 1437 | 45896 | 2,780 | 2 | $205,176 | 1,390 | $73.80 | $10,770,101 | $16,576,201 | $4,964,001 | $0.00 | $0.00 | $49.0 |
| 1438 | 45897 | 18 | 0 | $0 | | $0.00 | $87,848 | $130,135 | $45,560 | $0.00 | $0.00 | |
| 1439 | 45898 | 1,241 | 2 | $236,289 | 621 | $190.40 | $5,844,782 | $9,015,485 | $2,674,080 | $0.00 | $0.00 | |
| 1440 | 45899 | 16 | 1 | $0 | | $0.00 | $74,993 | $115,676 | $34,311 | $0.00 | $0.00 | |
| 1441 | 45950 | 6 | 0 | $0 | | $0.00 | $19,485 | $30,178 | $8,792 | $0.00 | $0.00 | |
| 1442 | Totals | 11,485,593 | 11,014 | $2,216,733,742 | | | $23,204,240,988 | $28,592,007,783 | $17,816,474,194 | | | |

TopQData / TopQ1 / TopQ2 / Q1LAD / Q1PCSales

RETAILER OPTIMIZATION USING MARKET SEGMENTATION TOP QUINTILE PROCESS

CROSS-REFERENCE TO RELATED APPLICATION

This application claims the priority to the U.S. Provisional Patent Application No. 60/737,793, "Retailer Optimization Using Market segmentation Top Quintile Process," filed on Nov. 17, 2005, the specification of which is incorporated in its entirety herein by this reference.

BACKGROUND OF THE INVENTION

1. Field of The Invention

The present invention relates to the sales of lottery services and more specifically to a method for determining an optimal number of lottery sales locations.

2. Description of Related Art

Lottery retailers are established with a business requesting a franchise from a lottery authority. Generally, the lottery authority is quite concerned with the honesty of the merchant who is applying for the franchise than the feasibility of the proposed location. As a result, it is common to see several lottery retailers in close proximity in a busy commercial location and very few retailers in residential areas. This phenomenon leads to the situation of less profit per retailer location and more overhead for the lottery authority when it has to deal with too many franchisees.

Therefore, it is desirable to have a method for determining the optimal number of lottery sales points per a geographical area, and it is to a such lottery game the present invention is primarily directed.

SUMMARY OF THE INVENTION

In one embodiment, there is provided a method for obtaining an optimal number of retailers in a geographical area. The method includes the step of obtaining demographical data for a plurality of regions. Each region is identified by a region identifier, the demographical data containing population information, retailer count, sales figures, retailer density count, and per capita sales information, the demographical data is segmented into subgroups. For each subgroup, the method further includes the steps of determining a top percentage of regions based on the population information, determining an average sales figure for the top percentage of regions, and determining an average retailer density count for the top percentage of regions. The method finally includes the step of computing the optimal number of retailers based on the average sales figure and average density count.

Other advantages and features of the present invention will become apparent after review of the hereinafter set forth Description of the Drawings, Detailed Description of the Invention, and the Claims.

DESCRIPTION OF THE DRAWINGS

FIGS. 3-19 illustrate different views of the spreadsheet utilized during the calculation of lottery agent density according to the present invention.

DETAILED DESCRIPTION OF THE INVENTION

Briefly described the invention is a method for determining an optimal number of lottery sales retailers per a geographical area. The geographical area can be defined in many different ways and readily available way to define different geographical areas is based on the commonly used ZIP code. Those skilled in the art will readily appreciate that other geographical classification and definitions can also be used. The optimal number of lottery retailers for a region can be determined based on the following assumptions:

I. Households of the same segmentations purchase lottery products similarly.

II. There is a strong correlation between lottery agent density (population/retailers) and per capita lottery sales.

III. Identify the lottery agent density (LAD) necessary to produce high per capita sales.

IV. Apply this optimal LAD to all markets of that household segmentation.

The average LAD for the top quintile (20%) of the regions in the U.S. defined by the ZIP codes can be used to derive the optimal number of retailers for every market. Preferably, between 40% and 60% of the ZIP codes can be used to result in a LAD between 1,000 and 1,500. The data for each geographical region are collected and the data are identified by the associated ZIP code. Other identifier may also be used if the geographical region a defined by something other than the ZIP code. Different geographical regions may be combined into one single region; alternatively, one large region may also be broken into several smaller regions. In case of the region being defined by the ZIP codes, sparsely populated regions with different ZIP codes may be combined into one single region. The data includes population, retailer count, sales, LAD (population/retailers), per-capital-sales (sales/population), segmentation groups (population count for each household segmentation group), and segmentation clusters population count for each household segmentation cluster). The population segmentation can be done according to different criteria and methods. The test has found that different results are obtained from clusters and groups, so both segmentation units are processed and the average of the two is used.

Figure 1:
FIG. 1 illustrates a sample entry in a spreadsheet to determine optimal locations for retailers.
Figure 2:
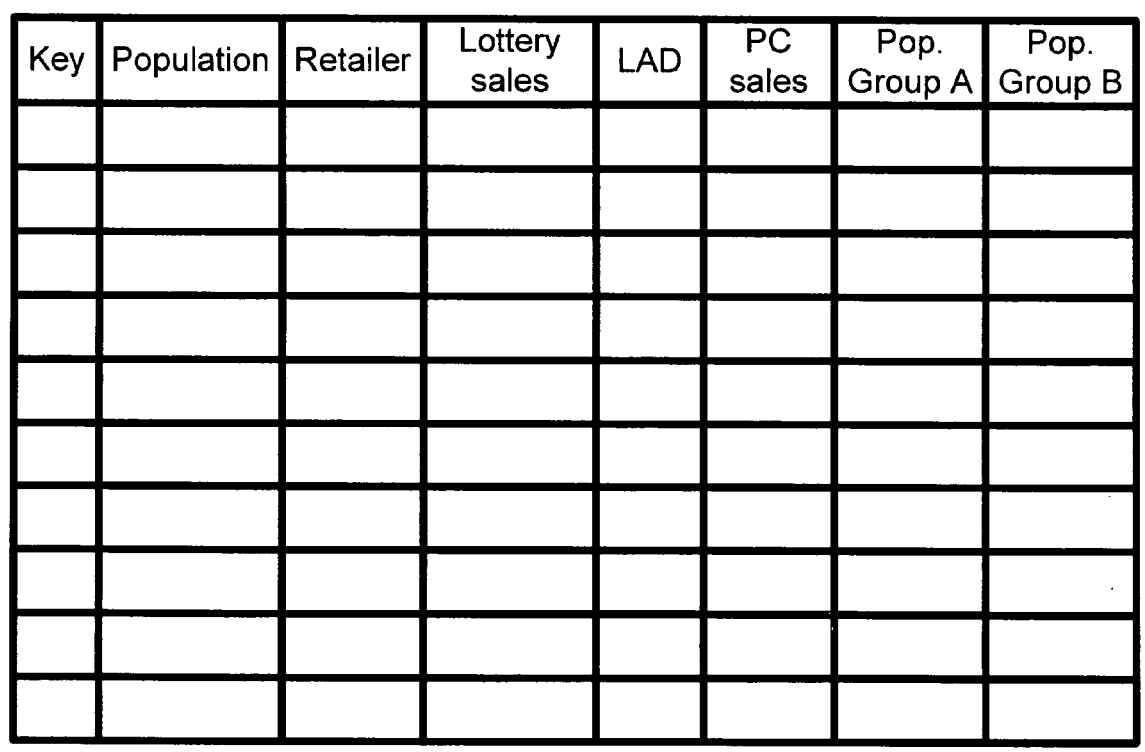
FIG. 2 is a representation of the spreadsheet with multiple data entries.

The data can be processed easily through a spreadsheet. Data for each geographical region is entered into one single row and each type of data is placed in on column. FIG. 1 illustrates a sample entry 100 in the spreadsheet. It is understood that the population segmentation is not limited to group A and group B and additional groups may be used. FIG. 2 is a representation of the spreadsheet with multiple data entries.

For a segmentation group, the data are then sorted in a descending order based on the PC sales. For the top 20% of the entries, it is calculated the average PC sales and average LAD. The method can be implemented through a spreadsheet such as Excel as illustrated below.

An exemplary table with 12 segmentation groups and 60 segmentation clusters shown in FIG. 3 is constructed and a copy of the table is created on a different tab TopQ1 for processing. The following steps are used to process this worksheet.

a. Sort retailers in a descending order and insert a blank row after the last ZIP code with a retailer. The result is shown in FIG. 3.

b. Sort the first segmentation group in a descending order and insert a blank line after the last ZIP code with population. The result is shown in FIG. 4.

c. Sort PC Sales in a descending order. The result is shown in FIG. 5.

d. In this example, there are 236 ZIP codes with Group A population. The top quintile of ZIP codes for Group A would be the first 47 ZIP codes.
e. Go to the second blank cell in Column G below the bottom of the table (Cell G1445) and enter the formula to find the average of PC Sales for the top quintile (=average(F2:F48). In this example, the average PC Sales for Group A is $821.33. The result is shown in FIG. 6.
f. In the next cell down enter the formula to calculate the average LAD for the top quintile for Group A (=average (E2:E48). For Group A the LAD for the top quintile is 738 and produces $821.33 in per capita sales. To speed this process and to aid in calculating other breaks, formulas to calculate the bottom row numbers are placed in column F so when the row number for the last row with population is entered in Cell A1445 the ending row number for each average formula is produced. The result is shown in FIG. 7.
g. The values of the calculations for Group A must now be saved so that the next column can be sorted and calculated. Select cells G1445:G1452 and copy. The past the value of these findings at cell G1445.
h. Now remove the blank row placed at row 238, and then sort Group B (Column H) descending and insert a blank row after the last ZIP code with population.
i. Again sort PC Sales descending and note that the last row with population in Group B is Row 243. The result is shown in FIG. 8.
j. Enter 243 in Cell A1445 and calculate the average for cell from row two through the rows indicated in cells F1445 through F1452 in Cells H1445 through H1452. The result is shown in FIG. 9.
k. Again copy and past the values of these new calculations and proceed to the next Group and continue until all groups and clusters have been calculated. For groups or clusters that have no ZIP codes with population, the results for all of PC Sales and LADs are zero. The result is shown in FIG. 10.

Figure 12:
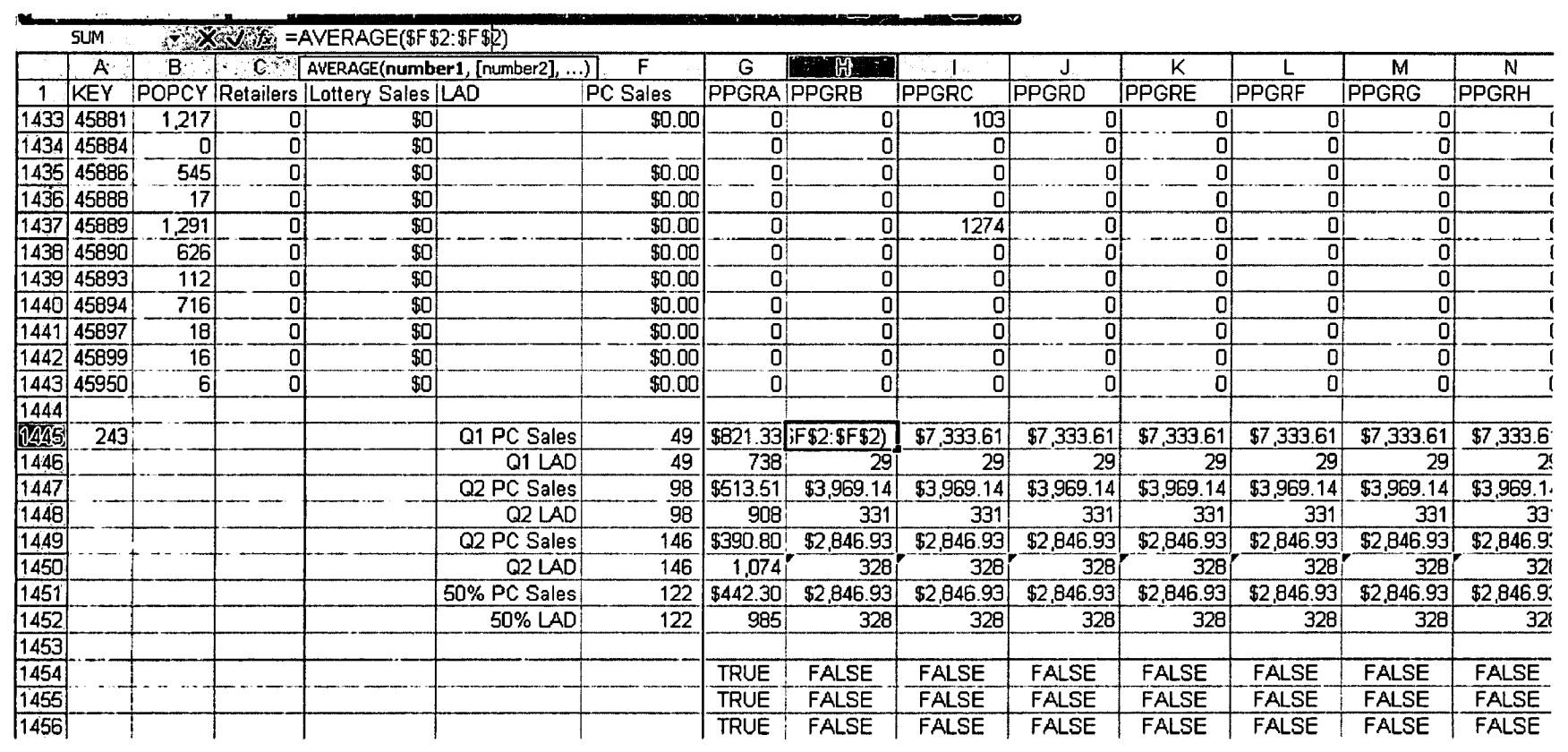

To reduce errors that may be committed during the computation, it is recommended the process be repeated. Make a copy of TopQ1 and rename it TopQ2. To identify errors in the processing, few formulas are added for testing differences in the result between the two worksheets and the result is shown in FIG. 11. Similarly, to reduce typing the formulas for calculating the average PC Sales, LADs is copied to the appropriate rows for each group and cluster. This facilitates the process by only having to enter the ending row number in each cells formula. The result is shown in FIG. 12.

Figures 14, 15, 16:
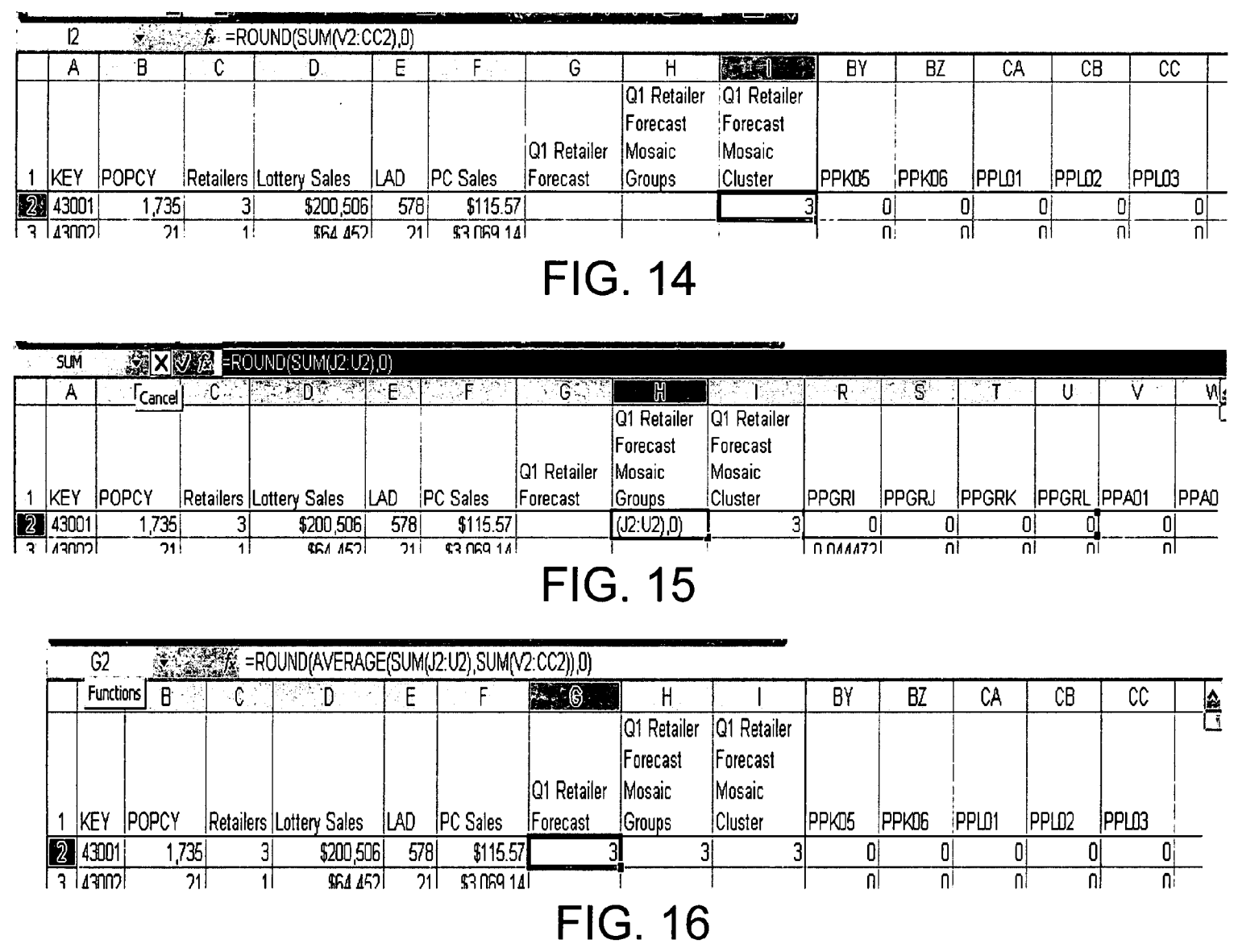

Now the LAD can be calculated as follows:
a. After completing all of the calculations in TopQ2, insure that all blank rows are removed from the data table and sort the table on ZIP code in ascending order. The TopQ2 table should now have the same number of data rows and in the same order as the TopQData tab.
b. Make another copy of the TopQData and label the tab Q1LAD. This will be used to calculate the recommended number of lottery retailers using the LAD for quintile one ZIP codes.
c. In Cell G2, the first data cell for Group A, enter the formula to divide the population in the same cell in TopQ2 by the quintile one LAD in Cell G1444 in TopQ2.
  i. Because this formula will be copied to the other cells within the table, the row number in the denominator should be locked by placing a dollar sign between the G and 1444.
  ii. Some of the Quintile One LADs for clusters are zero and using them as the denominator will result in division by zero errors.
  iii. To trap the division by zero error, add an IF test to the formula for the LAD greater than zero and if the LAD is not greater than zero return zero (=IF (TopQ2!G$1444>0,TopQ2!G2/TopQ2!G$1444,0)). The result is shown in FIG. 13.
d. Copy this formula to all the group and cluster cells in the data table Q1LAD.
e. Insert three columns after column F in the Q1LAD tab and label them Q1 Retailer Forecast, Q1 Retailer Forecast Mosaic Groups, and Q1 Retailer Forecast Mosaic Cluster.
f. In Cell I2 enter the formula to find the SUM of all cluster for the row, and since there can not be a partial retailer the results should be rounded to the whole number (=ROUND (SUM(V2:CC2),0)). The result is shown in FIG. 14.
g. In Cell H2 enter the formula to find the SUM of all of the groups in the row, and again round to a whole number (=ROUND(SUM(J2:U2),0)). The result is shown in FIG. 15.
h. In Cell G2 enter the formula to calculate the average of the some of the groups and the sum of the clusters and round to the whole number (=ROUND(AVERAGE(SUM(J2:U2), SUM(V2:CC2)),0)). The result is shown in FIG. 16.
i. Copy Cells G2:I2 and past to all of the table's rows.
j. At the bottom of the table I have added some totals and calculated the LAD at the old and recommended retailer counts. The recommended number of lottery retailers for this example is 17,583 and would result in a LAD of 653. The result is shown in FIG. 17.

To calculate the expected sales from LAD just calculated the same process as for calculating the retailers will be used.
a. Make a copy of the TopQData and rename it Q1PCSales.
b. In Cell G2 enter the formula to calculate the sales for Group A in the ZIP code 43001, and again lock the row the quintile one PC Sales in the formula (=TopQ2!G2*TopQ2!G$1443).
c. Copy this formula to all rows for both the group and cluster columns. The result is shown in FIG. 18.
d. Insert three columns after column F.
e. Enter in Cell I2 the formula for the sum of all of the cluster columns for row 2 (=SUM(V2:CC2)).
f. Enter in Cell H2 the formula for the sum of all of the group columns for row 2 (=SUM(J2:U2)).
g. Enter in Cell G2 the formula to calculate the average of the sum of the group cells and the sum of the cluster cells (=AVERAGE(SUM(J2:U2),SUM(V2:CC2))).
h. Copy the formulas in cells G2:I2 and past to all the rows.
i. Add totals at the bottom of the table. The result is shown in FIG. 19.

The above specification described a method for obtaining an optimal number of lottery retailers in a geographical region, the invention may also be used to obtain the optimal number of other types of retailers in any given region.

Although preferred embodiments of the invention have been disclosed in the foregoing specification, it is understood by those skilled in the art that many modifications and other embodiments of the invention will come to mind to which the invention pertains, having the benefit of the teaching presented in the foregoing description and associated drawings. Moreover, although specific terms are employed herein, they are used in a generic and descriptive sense only, and not for the purposes of limiting the described invention.

What is claimed is:
1. A method for obtaining an optimal number of retailers in a geographical area, the method comprising the steps of:
  obtaining demographical data for a plurality of regions, each region being identified by a region identifier, the demographical data containing population information, retailer count, sales figures, retailer density count, and per capita sales information, the demographical data being segmented into subgroups and inputting same into a computerized spreadsheet containing the region identifier and demographical data;

sorting the region identifiers in descending order based on the retailer count and omitting any region identifiers with zero retailer count;

for each subgroup:

sorting the remaining region identifiers via the electronic spreadsheet based on a population of the selected subgroup and further omitting any of the plurality of regions with a zero population for the subgroup;

sorting the remaining region identifiers based on per capita sales using the computerized spreadsheet;

determining a top percentage of regions from the resulting region identifiers based on the population information wherein the top percentage comprises selecting a percentage of the region identifiers for analysis after using the computerized spreadsheet to rank at least one of the demographical data categories of the subgroup, determining an average sales figure for the top percentage of regions via the computerized spreadsheet, determining an average retailer density count for the top percentage of regions using the computerized spreadsheet; and computing via the computerized spreadsheet the optimal number of retailers based on the average sales figure and average density count.

2. The method of claim 1, further comprising the step of using the computerized spreadsheet to compute an expected sales figure for the optimal number of retailers.

3. The method of claim 1 wherein the top percentage comprises at least 20% of the subgroup.

4. The method of claim 1 wherein the percentage comprises at least between 40% and 60% of the subgroup.

5. The method of claim 1 wherein the retailer is a lottery retailer.

6. A method for obtaining an optimal number of retailers in a geographical area, the method comprising the steps of:

obtaining demographical data for a plurality of regions, each region being identified by a region identifier, the demographical data containing population information, retailer count, sales figures, retailer density count, and per capita sales information, the demographical data being segmented into subgroups and input into a computerized spreadsheet containing the region identifier and demographical data;

sorting the retailer count in descending order via the computerized spreadsheet and creating a sample by omitting any region identifier wherein the retailer count is zero;

for each subgroup in the sample:

using the computerized spreadsheet to sort population of the subgroup in descending order and further omitting any region identifiers wherein the population is zero;

ordering the per capita sales contained in the sample in descending order using the spreadsheet;

selecting a percentage of the remaining region identifiers for analysis using the computerized spreadsheet, determining an average per capita sales figure via the computerized spreadsheet, and determining an average retailer density count using the computerized spreadsheet; and using the computerized spreadsheet to compute the optimal number of retailers based on the average sales figure and average density count.

7. The method of claim 6, further comprising the step of using the computerized spreadsheet to compute an expected sales figure for the optimal number of retailers.

8. The method of claim 6 wherein the percentage comprises 20% of the sample.

9. The method of claim 6 wherein the percentage comprises between 40% and 60% of the sample.

* * * * *